US009929596B2

(12) United States Patent
Chen

(10) Patent No.: US 9,929,596 B2
(45) Date of Patent: Mar. 27, 2018

(54) WIRELESS POWER TRANSMISSION DEVICE

(71) Applicant: Primax Electronics Ltd., Neihu, Taipei (TW)

(72) Inventor: Chih Hung Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 881 days.

(21) Appl. No.: 14/252,053

(22) Filed: Apr. 14, 2014

(65) Prior Publication Data

US 2015/0188318 A1    Jul. 2, 2015

(30) Foreign Application Priority Data

Dec. 30, 2013  (CN) .......................... 2013 1 0743155

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H02J 5/00* | (2016.01) |
| *H02J 50/40* | (2016.01) |
| *H02J 7/00* | (2006.01) |
| *H02J 7/02* | (2016.01) |

(52) U.S. Cl.
CPC .............. *H02J 50/10* (2016.02); *H02J 5/005* (2013.01); *H02J 7/0044* (2013.01); *H02J 7/025* (2013.01); *H02J 50/40* (2016.02)

(58) Field of Classification Search
CPC .......... H02J 5/005; H02J 7/025; H02J 7/0044; H02J 50/10; H02J 50/40
USPC ......................................... 307/104; 455/41.1
See application file for complete search history.

(56) References Cited

U.S. PATENT DOCUMENTS

2014/0197694 A1\*  7/2014  Asanuma ................ H01F 38/14
                                                         307/104
2016/0141884 A1\*  5/2016  Lee .......................... H02J 17/00
                                                         307/104

FOREIGN PATENT DOCUMENTS

| KR | 1020130076575 | * | 7/2013 |
| WO | WO2013179639 | * | 12/2013 |

\* cited by examiner

*Primary Examiner* — Richard Tan
(74) *Attorney, Agent, or Firm* — Kirton McConkie; Evan R. Witt

(57) ABSTRACT

A wireless power transmission device includes a main body and a transmitter coil plate. The transmitter coil plate is disposed within the main body. The transmitter coil plate includes a coil plate body, a first transmitter coil structure, and a second transmitter coil structure. The first transmitter coil structure is disposed on a top surface of the coil plate body, and swirled along a first direction. The second transmitter coil structure is disposed on a bottom surface of the coil plate body, and swirled along a second direction. When the transmitter coil plate is magnetized, the magnetic flux generated by the transmitter coil plate is increased. Consequently, the wireless charging efficiency is enhanced.

3 Claims, 4 Drawing Sheets

WIRELESS POWER TRANSMISSION DEVICE

FIELD OF THE INVENTION

The present invention relates to a power transmission device, and more particularly to a wireless power transmission device using a wireless charging technology.

BACKGROUND OF THE INVENTION

Nowadays, a variety of commercially-available electronic devices are developed toward small size and light weightiness in order to have the portability. In addition, the electronic devices have touch screens. By inputting commands into the touch screens, the electronic devices can be operated accordingly. For example, the electronic devices include mobile phones, tablet computers, personal digital assistants (PDAs), handheld game consoles (e.g. PSP, NDSL and Gameboy series game consoles), or the like.

Due to the portability of the above electronic devices, these electronic devices cannot be connected with a power source at any time. For providing sufficient electric power to the electronic device, a built-in battery is usually installed in the electronic device. The battery is a chargeable battery. Once a power socket for a power source is available, the electronic device may be plugged into the power socket, so that the chargeable battery of the electronic device is charged by the power source.

In case that the residual battery capacity of the electronic device is insufficient, the chargeable battery of the portable electronic device may be charged through a connecting wire. A first end of the connecting wire is plugged into the electronic device, and a second end of the connecting wire is plugged into a power source or a mobile bank that can store electric power. Under this circumstance, the electric power provided by the power source or the mobile bank may be transmitted to the electronic device through the connecting wire in order to charge the electronic device.

However, the applications of the charging process are usually restricted by the length of the connecting wire. For example, during the process of charging the electronic device, the connecting wire usually becomes hindrance from operating the device or arbitrarily moving the electronic device.

With development of a wireless charging technology, a wireless power transmission device for wirelessly charging the electronic device has been disclosed in order to solve the drawbacks of the wired charging technology of using the connecting wire. FIG. 1 schematically illustrates the relationship between a conventional wireless power transmission device and a conventional portable electronic device. As shown in FIG. 1, the conventional wireless power transmission device 1 comprises a main body 10, a power cable 11, a driving module 12, and a transmitter coil 13. In addition, the conventional portable electronic device 2 comprises a casing 20, a receiver coil 21, and a chargeable battery (not shown).

The power cable 11 of the conventional wireless power transmission device 1 is exposed outside the main body 10 to be connected with a power source (not shown). The driving module 12 and the transmitter coil 13 are both disposed within the main body 10. In addition, the driving module 12 is connected with the power cable 11 and the transmitter coil 13. When the driving module 12 is driven by the power source, the driving module 12 generates an electric current. When the electric current flows through the transmitter coil 13, an electromagnetic effect occurs. In response to the magnetic flux generated by the electromagnetic effect, the transmitter coil 13 outputs a corresponding electric power. The transmitter coil 13 is wound to have a circular shape. On the other hand, the receiver coil 21 is disposed within the casing 20 of the conventional portable electronic device 2 for receiving the electric power from the transmitter coil 13. The chargeable battery is connected with the receiver coil 21. After the electric power is received by the closed receiver coil 21, the electric power is stored in the chargeable battery so as to be utilized.

Generally, the main body 10 of the conventional wireless power transmission device 1 is designed to have a platform profile. In addition, the volume of the main body 10 of the conventional wireless power transmission device 1 is larger than the casing 20 of the conventional portable electronic device 2 in order to facilitate the user to place the conventional portable electronic device 2 thereon. During the process of transmitting the electric power from the conventional wireless power transmission device 1 to the conventional portable electronic device 2, the receiver coil 21 within the conventional portable electronic device 2 should be purposely placed at a position near the transmitter coil 13 of the conventional wireless power transmission device 1. That is, for allowing the receiver coil 21 to receive the electric power, the transmitter coil 13 should be aligned with the closed receiver coil 21 as precisely as possible.

As the size of the electronic device 2 is increased (for example the size of a display screen of the electronic device 2 is increased), the main body 10 of the conventional wireless power transmission device 1 should be correspondingly increased. Consequently, the transmitter coil 13 within the main body 10 is also increased. The transmitter coil 13 is also wound to have a circular shape. As the circularly wound transmitter coil 13 is increased, the distance between the center of the transmitter coil 13 and the circumference of the transmitter coil 13 is increased. Under this circumstance, the magnetic flux generated at the center of the transmitter coil 13 is reduced, and thus the charging efficiency is reduced.

Therefore, there is a need of providing a wireless power transmission device with enhanced charging efficiency.

SUMMARY OF THE INVENTION

An object of the present invention provides a wireless power transmission device with enhanced charging efficiency.

In accordance with an aspect of the present invention, there is provided a wireless power transmission device for transmitting an electric power to a receiver coil of an electronic device. The wireless power transmission device includes a main body, and a transmitter coil plate. The electronic device is placed on the main body. The transmitter coil plate is disposed within the main body, and generates an electromagnetic effect. In response to the electromagnetic effect, the transmitter coil plate outputs the electric power to the receiver coil. The transmitter coil plate includes a coil plate body, a first transmitter coil structure, and a second transmitter coil structure. The coil plate body includes a top surface and a bottom surface. The first transmitter coil structure is disposed on the top surface of the coil plate body. The first transmitter coil structure is swirled along a first direction, so that an electric current flows through the first transmitter coil structure along the first direction. The second transmitter coil structure is disposed on the bottom surface of the coil plate body, and connected with the first transmitter coil structure. The second transmitter coil structure is swirled along a second direction, so that the electric current flows through the second transmitter coil structure along the second direction. The first direction and the second direction are opposed to each other.

In accordance with another aspect of the present invention, there is provided a wireless power transmission device for transmitting an electric power to a receiver coil of an electronic device. The wireless power transmission device includes a main body, and a transmitter coil plate. The electronic device is placed on the main body. The transmitter coil plate is disposed within the main body, and generates an electromagnetic effect. In response to the electromagnetic effect, the transmitter coil plate outputs the electric power to the receiver coil. The transmitter coil plate includes a coil plate body, a first transmitter coil structure, and a second transmitter coil structure. The coil plate body includes a top surface and a bottom surface. The first transmitter coil structure is disposed on the top surface of the coil plate body. The first transmitter coil structure is swirled along a first direction, so that an electric current flows through the first transmitter coil structure along the first direction. The second transmitter coil structure is disposed on the bottom surface of the coil plate body, and connected with the first transmitter coil structure. The second transmitter coil structure is swirled along the first direction. Moreover, plural ring-shaped closed coils are defined by the first transmitter coil structure and the second transmitter coil structure collaboratively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
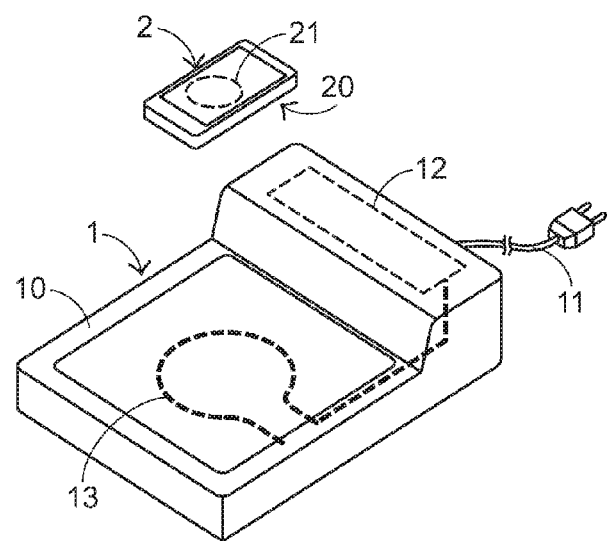
FIG. 1 schematically illustrates the relationship between a conventional wireless power transmission device and a conventional portable electronic device.
Figure 2:
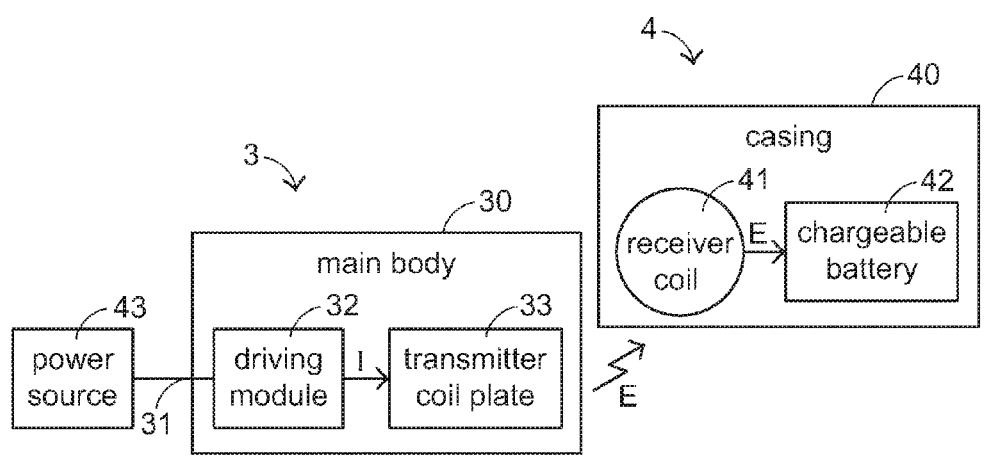
FIG. 2 is a schematic functional block diagram illustrating the relationship between a wireless power transmission device and an electronic device according to a first embodiment of the present invention.
Figure 3:
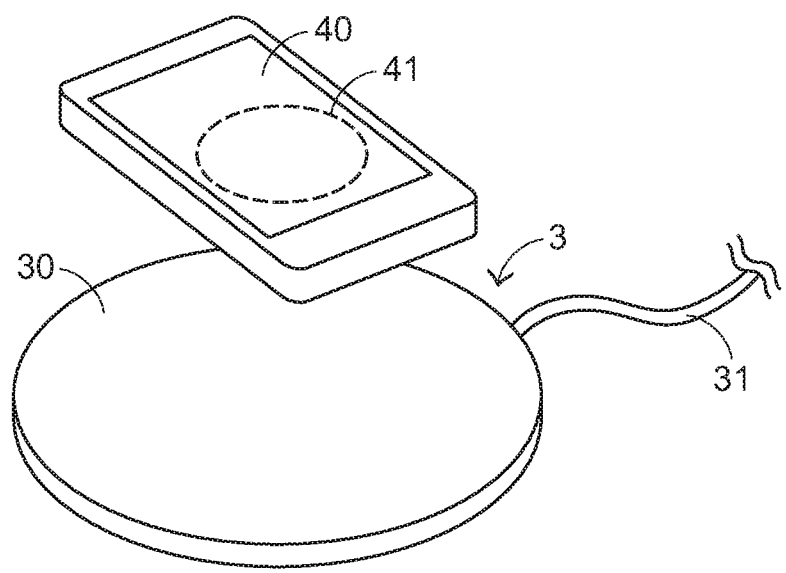
FIG. 3 is a schematic perspective view illustrating the relationship between the wireless power transmission device and the electronic device according to the first embodiment of the present invention.

For eliminating the drawbacks of the conventional technologies, the present invention provides a wireless power transmission device. FIG. 2 is a schematic functional block diagram illustrating the relationship between a wireless power transmission device and an electronic device according to a first embodiment of the present invention. FIG. 3 is a schematic perspective view illustrating the relationship between the wireless power transmission device and the electronic device according to the first embodiment of the present invention. As shown in FIGS. 2 and 3, the wireless power transmission device 3 comprises a main body 30, a power cable 31, a driving module 32, and a transmitter coil plate 33. In addition, the electronic device 4 comprises a casing 40, a receiver coil 41, and a chargeable battery 42. The wireless power transmission device 3 may transmit an electric power E to the receiver coil 41 of the electronic device 4 in order to charge the chargeable battery 42 of the electronic device 4. The electronic device 4 may be placed on the main body 30. The power cable 31 is exposed outside the main body 30 in order to be connected with a power source 43. The driving module 32 is connected with the transmitter coil plate 33 and the power source 43 for providing an electric current I. The transmitter coil plate 33 is disposed within the main body 30. When the electric current I flows through the transmitter coil plate 33, an electromagnetic effect occurs. In response to the magnetic flux generated by the electromagnetic effect, the transmitter coil plate 33 outputs the electric power E to the receiver coil 41.

On the other hand, the receiver coil 41 is disposed within the casing 40 of the electronic device 4 for receiving the electric power E from the transmitter coil plate 33. The chargeable battery 42 is disposed within the casing 40 and electrically connected with the receiver coil 41 for storing the electric power E which is received by the receiver coil 41. Consequently, the chargeable battery 42 is charged. In this embodiment, the main body 30 of the wireless power transmission device 3 has a disc profile. An example of the electronic device 4 includes but is not limited to a mobile phone. In addition, the receiver coil 41 is wound to have a circular shape.

Figure 4:
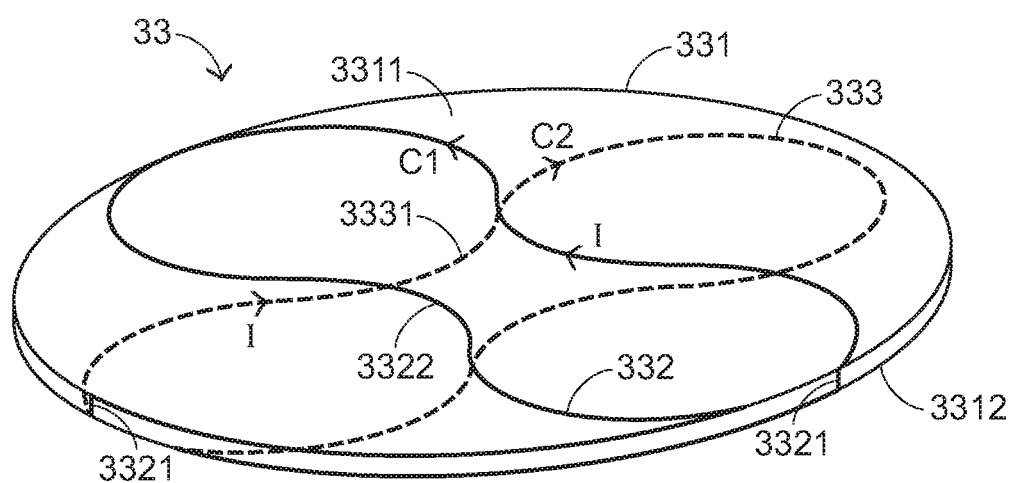
FIG. 4 schematically illustrates the structure of the transmitter coil plate of the wireless power transmission device according to the first embodiment of the present invention.

Hereinafter, the structure of the transmitter coil plate 33 will be illustrated with reference to FIG. 4. FIG. 4 schematically illustrates the structure of the transmitter coil plate of the wireless power transmission device according to the first embodiment of the present invention. As shown in FIG. 4, the transmitter coil plate 33 comprises a coil plate body 331, a first transmitter coil structure 332, and a second transmitter coil structure 333. The coil plate body 331 comprises a top surface 3311 and a bottom surface 3312. The first transmitter coil structure 332 is disposed on the top surface 3311 of the coil plate body 331, and connected with the second transmitter coil structure 333. In addition, the first transmitter coil structure 332 is swirled along a first direction C1, so that an electric current I flows through the first transmitter coil structure 332 along the first direction C1. The second transmitter coil structure 333 is disposed on the bottom surface 3312 of the coil plate body 331, and connected with the first transmitter coil structure 332. In addition, the second transmitter coil structure 333 is swirled along a second direction C2, so that the electric current I flows through the second transmitter coil structure 333 along the second direction C2. The second direction C2 is opposed to the first direction C1.

In this embodiment, the coil plate body 331 has a disc profile. Moreover, the coil plate body 331 is a copper clad laminate, the first direction C1 is a counterclockwise direction, and the second direction C2 is a clockwise direction. In this embodiment, the first transmitter coil structure 332 is a first copper foil structure formed on the top surface 3311 of the coil plate body 331, and the second transmitter coil structure 333 is formed on the bottom surface 3312 of the coil plate body 331.

The first transmitter coil structure 332 of the coil plate body 331 comprises plural junction parts 3321. The plural junction parts 3321 are disposed on the coil plate body 331 and connected with the second transmitter coil structure 333. Through the junction parts 3321, the electrical connection between the first transmitter coil structure 332 and the second transmitter coil structure 333 is established. In this embodiment, the plural junction parts 3321 are disposed on the top surface 3311 of the coil plate body 331, extended from the top surface 3311 of the coil plate body 331 to the bottom surface 3312 of the coil plate body 331, and connected with the second transmitter coil structure 333. That is, the plural junction parts 3321 do not run through the top surface 3311 and the bottom surface 3312 of the coil plate body 331. It is noted that numerous modifications and alterations may be made while retaining the teachings of the invention. For example, in some other embodiments, the plural junction parts may run through the top surface and the bottom surface of the coil plate body.

As shown in FIG. 4, the first transmitter coil structure 332 is wound to have a first dumbbell shape, and the second transmitter coil structure 333 is wound to have a second dumbbell shape. A first middle portion 3322 of the first transmitter coil structure 332 and a second middle portion 3331 of the second transmitter coil structure 333 are partially overlapped with each other. Consequently, the first transmitter coil structure 332 and the second transmitter coil structure 333 are collaboratively in a shape of a cross. When the driving module 32 is enabled to generate the electric current I, the electric current I flows through the first transmitter coil structure 332 along the first direction C1, so that a first-part electromagnetic effect occurs. Moreover, the electric current I flows through the second transmitter coil structure 333 along the second direction C2, so that a second-part electromagnetic effect occurs. Since the first middle portion 3322 of the first transmitter coil structure 332 and the second middle portion 3331 of the second transmitter coil structure 333 are partially overlapped with each other, a synergistic action of the first-part electromagnetic effect and the second-part electromagnetic effect results in the electromagnetic effect of the transmitter coil plate 33. The magnetic flux generated by the electromagnetic effect of the transmitter coil plate 33 is much higher than the magnetic flux generated by the conventional circular coil, and the size of the coil plate body 331 is substantially identical to the size of the conventional circular coil. Consequently, in response to the electromagnetic effect, the wireless power transmission device 3 generates the electric power E. The electric power E is transmitted to the electronic device 4 to charge the chargeable battery 42 of the electronic device 4.

Figure 5:
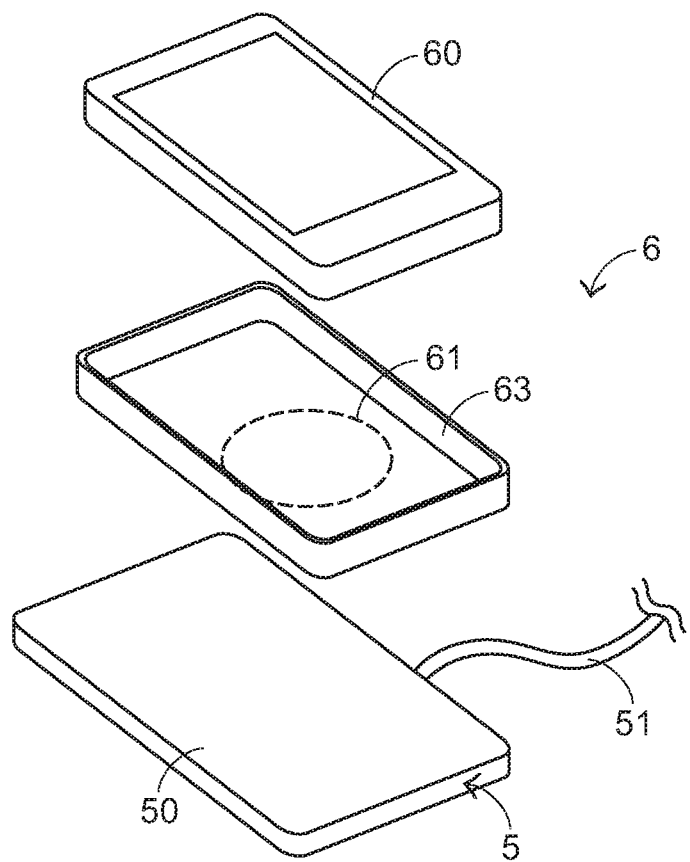
FIG. 5 is a schematic perspective view illustrating the relationship between a wireless power transmission device and an electronic device according to a second embodiment of the present invention.
Figure 6:
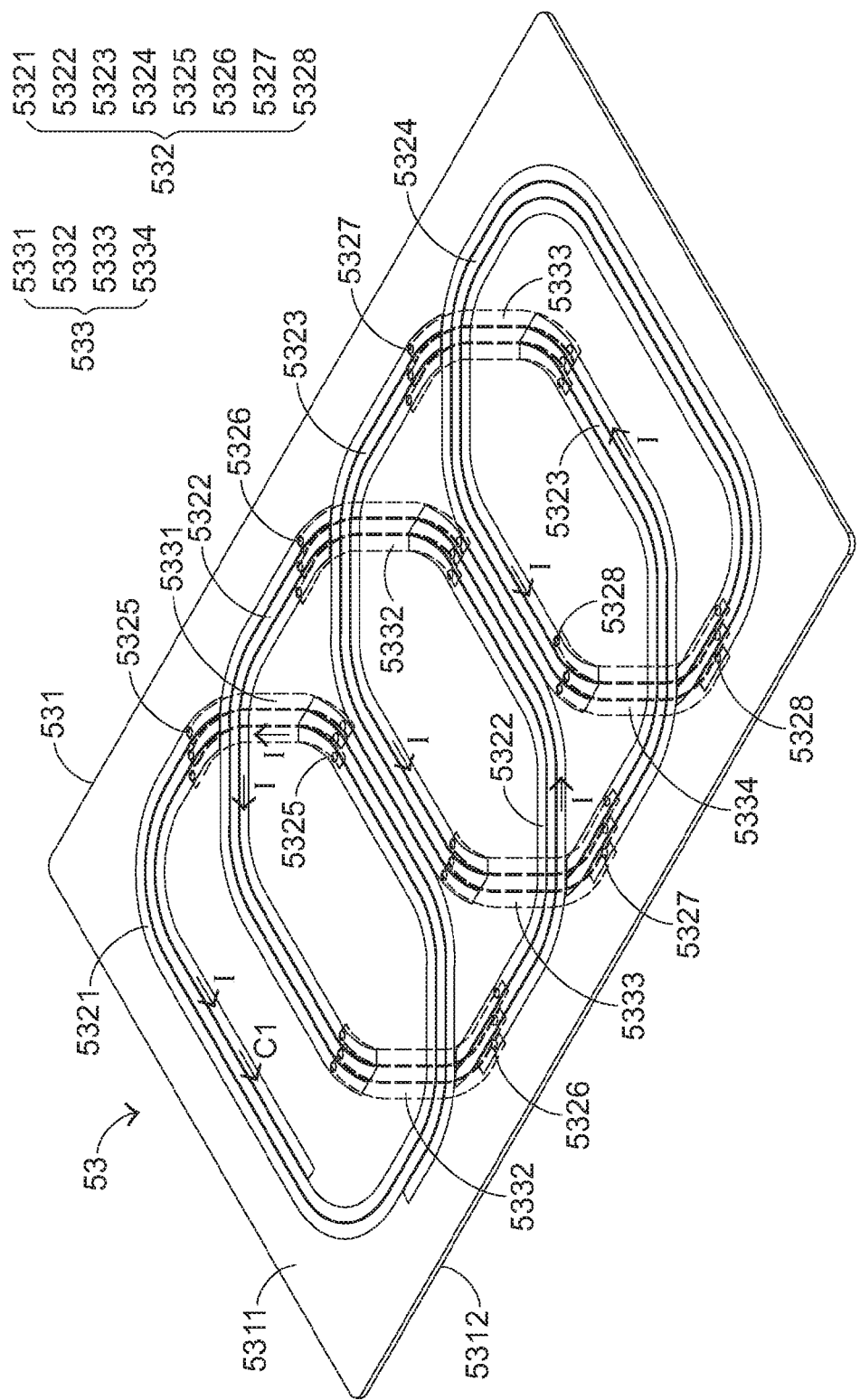
FIG. 6 schematically illustrates the structure of the transmitter coil plate of the wireless power transmission device according to the second embodiment of the present invention.

The present invention further provides a second embodiment, which is distinguished from the first embodiment. FIG. 5 is a schematic perspective view illustrating the relationship between a wireless power transmission device and an electronic device according to a second embodiment of the present invention. FIG. 6 schematically illustrates the structure of the transmitter coil plate of the wireless power transmission device according to the second embodiment of the present invention. As shown in FIGS. 5 and 6, the wireless power transmission device 5 comprises a main body 50, a power cable 51, a driving module (not shown), and a transmitter coil plate 53. The transmitter coil plate 53 comprises a coil plate body 531, a first transmitter coil structure 532, and a second transmitter coil structure 533. In addition, the electronic device 6 comprises a casing 60, a receiver coil 61, a chargeable battery (not shown), and a protective cover 63. The protective cover 63 is used for partially covering the casing 60 of the electronic device 6. The receiver coil 61 of the electronic device 6 is disposed within the protective cover 63. The chargeable battery is disposed within the casing 60. After the casing 60 of the electronic device 6 is partially covered by the protective cover 63, the chargeable battery and the receiver coil 61 are electrically connected with each other. Consequently, an electric power E may be transmitted from the wireless power transmission device 5 to the receiver coil 61 within the protective cover 63, and the electric power E may be transmitted to the chargeable battery within the casing 60.

Except for the following two items, the configurations of other components of the wireless power transmission device 5 of this embodiment are substantially similar to those of the wireless power transmission device 2 of this embodiment, and are not redundantly described herein.

Firstly, the main body 50 and the coil plate body 531 have quadrilateral shapes, and the volume of the main body 50 is larger than the volume of the coil plate body 531. It is noted that numerous modifications and alterations may be made while retaining the teachings of the invention. For example, in some other embodiments, the main body and the coil plate body of the wireless power transmission have polygonal shapes.

Secondly, the ways of winding the first transmitter coil structure 532 and the second transmitter coil structure 533 of the transmitter coil plate 53 are distinguished. Please refer to FIG. 6. The first transmitter coil structure 532 comprises plural first curvy segments 5321, plural second curvy segments 5322, plural third curvy segments 5323, plural fourth curvy segments 5324, plural first junction parts 5325, plural second junction parts 5326, plural third junction parts 5327, and plural fourth junction parts 5328. All of the plural first curvy segments 5321, the plural second curvy segments 5322, the plural third curvy segments 5323 and the plural fourth curvy segments 5324 are disposed on a top surface 5311 of the coil plate body 531 and swirled along a first direction C1. The plural first junction parts 5325 are correlated with the plural first curvy segments 5321, respectively. In addition, the plural first junction parts 5325 are coupled to the corresponding first curvy segments 5321. The plural first junction parts 5325 run through the top surface 5311 and a bottom surface 5312 of the coil plate body 531. Similarly, the plural second junction parts 5326 are correlated with the plural second curvy segments 5322, respectively. In addition, the plural second junction parts 5326 are coupled to the corresponding second curvy segments 5322. The plural second junction parts 5326 run through the top surface 5311 and the bottom surface 5312 of the coil plate body 531. Similarly, the plural third junction parts 5327 are correlated with the plural third curvy segments 5323, respectively. In addition, the plural third junction parts 5327 are coupled to the corresponding third curvy segments 5323. The plural third junction parts 5327 run through the top surface 5311 and the bottom surface 5312 of the coil plate body 531. Similarly, the plural fourth junction parts 5328 are correlated with the plural fourth curvy segments 5324, respectively. In addition, the plural fourth junction parts 5328 are coupled to the corresponding fourth curvy segments 5324. The plural fourth junction parts 5328 run through the top surface 5311 and the bottom surface 5312 of the coil plate body 531.

In this embodiment, all of the plural first curvy segments 5321, the plural second curvy segments 5322, the plural third curvy segments 5323 and the plural fourth curvy segments 5324 are first copper foil structures that are formed on the top surface 5311 of the coil plate body 531. Moreover, all of the plural first junction parts 5325, the plural second junction parts 5326, the plural third junction parts 5327 and the plural fourth junction parts 5328 are third copper foil structures that run through the top surface 5311 and the bottom surface 5312 of the coil plate body 531.

On the other hand, the second transmitter coil structure 533 comprises plural fifth curvy segments 5331, plural sixth curvy segments 5332, plural seventh curvy segments 5333, and plural eighth curvy segments 5334. All of the plural fifth curvy segments 5331, the plural sixth curvy segments 5332, the plural seventh curvy segments 5333 and the plural eighth curvy segments 5334 are disposed on the bottom surface 5312 of the coil plate body 531 and swirled along the first direction C1. The plural fifth curvy segments 5331 are correlated with the plural first curvy segments 5321, respectively. In addition, the plural fifth curvy segments 5331 are connected with the plural first junction parts 5325 corresponding to the plural first curvy segments 5321. The plural sixth curvy segments 5332 are correlated with the plural second curvy segments 5322, respectively. In addition, the plural sixth curvy segments 5332 are connected with the plural second junction parts 5326 corresponding to the plural second curvy segments 5322. The plural seventh curvy segments 5333 are correlated with the plural third curvy segments 5323, respectively. In addition, the plural seventh curvy segments 5333 are connected with the plural third junction parts 5327 corresponding to the plural third curvy segments 5323. The plural eighth curvy segments 5334 are correlated with the plural fourth curvy segments 5324, respectively. In addition, the plural eighth curvy segments 5334 are connected with the plural fourth junction parts 5328 corresponding to the plural fourth curvy segments 5324. In this embodiment, all of the plural fifth curvy segments 5331, the plural sixth curvy segments 5332, the plural seventh curvy segments 5333 and the plural eighth curvy segments 5334 are second copper foil structures that are formed on the bottom surface 5312 of the coil plate body 531.

As shown in FIG. 6, each first curvy segment 5321 and the corresponding fifth curvy segment 5331 are collaboratively defined as a first ring-shaped closed coil; each second curvy segment 5322 and the corresponding sixth curvy segment 5332 are collaboratively defined as a second ring-shaped closed coil; each third curvy segment 5323 and the corresponding seventh curvy segment 5333 are collaboratively defined as a third ring-shaped closed coil; and each fourth curvy segment 5324 and the corresponding eighth curvy segment 5334 are collaboratively defined as an fourth ring-shaped closed coil. In addition, the second ring-shaped closed coil runs through the first ring-shaped closed coil and the third ring-shaped closed coil; and the third ring-shaped closed coil runs through the second ring-shaped closed coil and the fourth ring-shaped closed coil.

When the electric current I flows through the first ring-shaped closed coil, a first-area electromagnetic effect occurs. Similarly, when the electric current I flows through the second ring-shaped closed coil, a second-area electromagnetic effect occurs. Similarly, when the electric current I flows through the third ring-shaped closed coil, a third-area electromagnetic effect occurs. Similarly, when the electric current I flows through the fourth ring-shaped closed coil, a fourth-area electromagnetic effect occurs. The first-area electromagnetic effect and the second-area electromagnetic effect at the overlap regions between the first ring-shaped closed coil and the second ring-shaped closed coil (i.e. the overlap regions between the first curvy segments 5321 and the sixth curvy segments 5332 and the overlap regions between the second curvy segments 5322 and the fifth curvy segments 5331). Similarly, the second-area electromagnetic effect and the third-area electromagnetic effect at the overlap regions between the second ring-shaped closed coil and the third ring-shaped closed coil (i.e. the overlap regions between the second curvy segments 5322 and the seventh curvy segments 5333 and the overlap regions between the third curvy segments 5323 and the sixth curvy segments 5332) are subject to a synergistic action. Similarly, the third-area electromagnetic effect and the fourth-area electromagnetic effect at the overlap regions between the fourth ring-shaped closed coil and the third ring-shaped closed coil (i.e. the overlap regions between the third curvy segments 5323 and the eighth curvy segments 5334 and the overlap regions between the fourth curvy segments 5324 and the seventh curvy segments 5333) are subject to a synergistic action.

In response to the first-area electromagnetic effect, the second-area electromagnetic effect, the third-area electromagnetic effect and the fourth-area electromagnetic effect generated by the first ring-shaped closed coil, the second ring-shaped closed coil, the third ring-shaped closed coil and the fourth ring-shaped closed coil in response to the corresponding synergistic actions, the electromagnetic effect of the transmitter coil plate 53 is generated. The magnetic flux generated by the electromagnetic effect of the transmitter coil plate 53 is much higher than the magnetic flux generated by the conventional circular coil. Consequently, in response to the electromagnetic effect, the wireless power transmission device 5 generates the electric power. The electric power is transmitted to the electronic device 6 to charge the chargeable battery of the electronic device 6.

From the above descriptions, the coil assembly of the wireless power transmission device for outputting the electric power comprises the first transmitter coil structure and the second transmitter coil structure. The first transmitter coil structure and the second transmitter coil structure are separated from each other by the coil plate body. Moreover, the first transmitter coil structure and the second transmitter coil structure are connected with each other to be collaboratively defined as a closed coil. The closed coil is specially wound to produce an overlap region. Consequently, the strength of the electromagnetic effect is increased, the electric power is increased, and the wireless charging efficiency is enhanced. On the other hand, the first transmitter coil structure is a first copper foil structure formed on the top surface of the coil plate body, and the second transmitter coil structure is formed on the bottom surface of the coil plate body. Consequently, the first transmitter coil structure and the second transmitter coil structure are integrated to the coil plate body. In comparison with the conventional transmitter coil, the transmitter coil plate of the wireless power transmission device of the present invention has smaller volume. Moreover, since the first transmitter coil structure and the second transmitter coil structure are not detached from the coil plate body, the wireless power transmission device of the present invention of the present invention can be carried more easily.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless power transmission device for transmitting an electric power to a receiver coil of an electronic device, the wireless power transmission device comprising:
 a main body, wherein the electronic device is placed on the main body; and
 a transmitter coil plate disposed within the main body, and generating an electromagnetic effect, wherein in response to the electromagnetic effect, the transmitter coil plate outputs the electric power to the receiver coil, wherein the transmitter coil plate comprises:
  a coil plate body comprising a top surface and a bottom surface;
  a first transmitter coil structure disposed on the top surface of the coil plate body, wherein the first transmitter coil structure is swirled along a first direction, so that an electric current flows through the first transmitter coil structure along the first direction, wherein the first transmitter coil structure further comprises:
   a first curvy segment;
   a second curvy segment located at a side of the first curvy segment;
   a first junction part disposed on the first curvy segment, and running through the top surface and the bottom surface of the coil plate body; and
   a second junction part disposed on the second curvy segment, and running through the top surface and the bottom surface of the coil plate body; and
  a second transmitter coil structure disposed on the bottom surface of the coil plate body, and connected with the first transmitter coil structure, wherein the second transmitter coil structure is swirled along the first direction, wherein plural ring-shaped closed coils are defined by the first transmitter coil structure and the second transmitter coil structure collaboratively, wherein the second transmitter coil structure further comprises:
   a third curvy segment corresponding to the first curvy segment, wherein the third curvy segment is connected with the first junction part, and the first curvy segment and the third curvy segment are collaboratively defined as a first ring-shaped closed coil of the plural ring-shaped closed coils; and
   a fourth curvy segment corresponding to the second curvy segment, wherein the fourth curvy segment is connected with the second junction part, and the second curvy segment and the fourth curvy segment are collaboratively defined as a second ring-shaped closed coil of the plural ring-shaped closed coils.

2. The wireless power transmission device according to claim 1, wherein when the electric current flows through the first ring-shaped closed coil, a first-area electromagnetic effect occurs, wherein when the electric current flows through the second ring-shaped closed coil, a second-area electromagnetic effect occurs, wherein a synergistic action of the first-area electromagnetic effect and the second-part electromagnetic effect at an overlap region between the first curvy segment and the fourth curvy segment and an overlap region between the second curvy segment and the third curvy segment results in the electromagnetic effect.

3. The wireless power transmission device according to claim 1, further comprising a driving module, wherein the driving module is connected with the transmitter coil plate and a power source, and provides the electric current, so that the electric current flows through the first transmitter coil structure and the second transmitter coil structure.

* * * * *